United States Patent
Kaneko et al.

(10) Patent No.: US 10,512,277 B2
(45) Date of Patent: Dec. 24, 2019

(54) METHOD OF PRODUCING AN UNFERMENTED BEER-TASTE BEVERAGE

(71) Applicant: ASAHI BREWERIES, LTD., Tokyo (JP)

(72) Inventors: Ryosuke Kaneko, Matsudo (JP); Shinsuke Ito, Nagareyama (JP)

(73) Assignee: ASAHI BREWERIES, LTD., Tokyo (JP)

( * ) Notice: Subject to any disclaimer, the term of this patent is extended or adjusted under 35 U.S.C. 154(b) by 474 days.

(21) Appl. No.: 15/389,638

(22) Filed: Dec. 23, 2016

(65) Prior Publication Data

US 2017/0099860 A1 Apr. 13, 2017

Related U.S. Application Data

(62) Division of application No. 14/232,651, filed as application No. PCT/JP2012/064512 on Jun. 6, 2012, now abandoned.

(30) Foreign Application Priority Data

Jul. 19, 2011 (JP) .................................. 2011-157964

(51) Int. Cl.
| | |
|---|---|
| *A23L 2/38* | (2006.01) |
| *A23L 2/52* | (2006.01) |
| *A23L 2/54* | (2006.01) |
| *A23L 2/56* | (2006.01) |

(52) U.S. Cl.
CPC ................... *A23L 2/38* (2013.01); *A23L 2/52* (2013.01); *A23L 2/54* (2013.01); *A23L 2/56* (2013.01); *A23V 2002/00* (2013.01)

(58) Field of Classification Search
CPC ................ A23L 2/52; A23L 2/38; C12G 3/06
USPC ................................................. 426/590, 598
See application file for complete search history.

(56) References Cited

U.S. PATENT DOCUMENTS

| | | | |
|---|---|---|---|
| 5,346,706 A | 9/1994 | Murray et al. | |
| 6,910,663 B1 | 6/2005 | Wubben et al. | |
| 8,337,932 B2 | 12/2012 | Takahashi et al. | |
| 2010/0028486 A1 | 2/2010 | Takahashi et al. | |
| 2012/0021116 A1 | 1/2012 | Itakura et al. | |
| 2013/0309388 A1 | 11/2013 | Yano et al. | |

FOREIGN PATENT DOCUMENTS

| | | |
|---|---|---|
| CN | 1155901 A | 7/1997 |
| CN | 101412951 A | 4/2009 |
| CN | 101594791 A | 12/2009 |
| CN | 103327838 A | 9/2013 |
| JP | 568528 B2 | 2/1993 |
| JP | 05068528 A | 3/1993 |
| JP | 8228753 | 9/1996 |
| JP | 8509855 | 10/1996 |
| JP | 2007082538 | 4/2007 |
| JP | 2010284153 A * | 1/2010 |
| JP | 2010284153 | 12/2010 |
| JP | 2011072228 | 4/2011 |
| WO | WO 2008069027 A1 * | 6/2008 |
| WO | WO-2008069027 A1 | 6/2008 |
| WO | WO-2010079634 A1 | 7/2010 |
| WO | WO-2010079778 A1 | 7/2010 |
| WO | WO-2012102198 A1 | 8/2012 |

OTHER PUBLICATIONS

Official Action of Japanese Patent Application No. 2011-157964 dated Sep. 30, 2013.
International Search Report for PCT/JP2012/064512 dated Aug. 28, 2012.
Yu Liping "Beer Science and Technology. Development Progress of Functional Beer", Liaozhong County in Liaoning Province; postcode 110200 Aug. 15, 2002.
Wei Yimin, "Cereal Quality and Food Processing", China Agricultural Scientech Press, Jun. 30, 2005.
Office Action in Chinese Application No. 2014091800973430 dated Sep. 23, 3014.
Office Action in Chinese Application No. 201280026488.4 dated Sep. 23, 2014.
Office Action in TW Application No. 101125665 dated Jan. 27, 2016, 5 pages.

* cited by examiner

*Primary Examiner* — Vera Stulii
(74) *Attorney, Agent, or Firm* — Marshall, Gerstein & Borun LLP

(57) ABSTRACT

An object of the present invention is to provide an unfermented beer-taste beverage which has an appearance with foam like beer, but does not have the characteristic odor common to beers and non-alcohol beer-taste beverages associated with fermentation; an unfermented beer-taste beverage containing a soybean dietary fiber does not have the characteristic odor common to general beers and non-alcohol beer-taste beverages associated with fermentation; when the beer-taste beverage is poured into a glass or the like, a beer-like foam with a good appearance can be formed; the foam arising from the glass is a fine and minute foam like champagne, and the foam arises linearly; in addition, the beer-like foam makes the mouthfeel smooth, and further provides a texture.

5 Claims, No Drawings

METHOD OF PRODUCING AN UNFERMENTED BEER-TASTE BEVERAGE

This application is a divisional of U.S. application Ser. No. 14/232,651, which is the U.S. National Stage of International Application No. PCT/JP2012/064512, filed Jun. 6, 2012, which claims the priority benefit of JP Application No. 2011-157964, filed Jul. 19, 2011, the entire respective disclosures of which are incorporated herein by reference.

TECHNICAL FIELD

The present invention relates to an unfermented beer-taste beverage.

BACKGROUND ART

Beers (including those not classified into beers of the Japanese Liquor Tax Law) are a representative example of conventional popular alcoholic beverages. Typically, beers are produced by saccharifying starch of barley to obtain wort, and subjecting the sugar components contained in the wort to alcoholic fermentation using yeast. Beers are characterized in that extremely wide varieties of texture, flavor, and taste, which are requirement of the products, can be achieved by setting, as appropriate, the kinds and ratio of main and auxiliary ingredients, fermentation conditions, and/or other conditions such as conditions of heating and filtering treatments, and the like employed in the beer production.

Here, beer-taste beverages (so-called, non-alcohol beer-taste beverages) have been widespread among consumers recently. The non-alcohol beer-taste beverages have alcohol contents of less than 1% by mass, and hence do not belong to alcoholic beverages of the Japanese Liquor Tax Law. Even when such a non-alcohol beer-taste beverage is ingested in a large amount to enjoy the beer taste, the total amount of alcohol ingested is small. Hence, the non-alcohol beer-taste beverages are suitable for water supply, and meet the needs of recent health oriented people (for example, see Patent Literatures 1 to 3). In general, the non-alcohol beer-taste beverages are produced by suppressing (insufficiently carrying out) the alcoholic fermentation in the production process, to thereby reduce the content of alcohol produced by the fermentation.

CITATION LIST

Patent Literature

[Patent Literature 1] Japanese Patent Application Publication No. Hei 8-228753
[Patent Literature 2] Japanese Patent Application Publication No. Hei 8-509855
[Patent Literature 3] Japanese Patent Application Publication No. Hei 5-068528

SUMMARY OF INVENTION

Technical Problems

Here, conventional beers include those obtained by fermenting ingredients including malt, which is the main ingredient, rice and the like, which are auxiliary ingredients, and hops and the like, and those obtained by fermenting ingredients including a protein degradation product of beans or maize, hops, and the like. Young people avoid these beers because of the characteristic odor, strong bitterness, and the like associated with the fermentation. As a result, people, especially young people, shift away from beers. In addition, the conventional non-alcohol beer-taste beverages likewise have the characteristic odor, strong bitterness, and the like associated with the fermentation. This is because these beer-taste beverages undergo the alcoholic fermentation process, although the alcoholic fermentation process is insufficient.

Accordingly, an object of the present invention is to provide an unfermented beer-taste beverage which has an appearance with foam like beer, but which does not have the characteristic odor common to beers and non-alcohol beer-taste beverages associated with fomentation.

Solution to Problems

In view of the above described problem, the inventors of the present invention have conducted earnest study. As a result, the inventors have found that an unfermented beer-taste beverage containing a soybean dietary fiber has an appearance with foam like beer, but does not have the characteristic odor common to beers and non-alcohol beer-taste beverages associated with fermentation. This finding has led to the completion of the present invention. Specifically, the present invention provides the following.

An aspect of the present invention is an unfermented beer-taste beverage comprising a soybean dietary fiber.

Advantageous Effects of Invention

The unfermented beer-taste beverage of the present invention is not fermented, and hence does not have the characteristic odor common to general beers and non-alcohol beer-taste beverages associated with fermentation. For this reason, the unfermented beer-taste beverage can be combined with any material without causing any strangeness, and a harmonized combination can be achieved. In addition, a fragrant odor characteristic of the soybean dietary fiber is provided to the unfermented beer-taste beverage, so that the flavor can be improved, and the beer taste can be increased.

In addition, the beer-taste beverage of the present invention contains the soybean dietary fiber. Hence, when the beer-taste beverage is poured into a glass or the like, a fine beer-like foam with a good appearance can be formed. The foam arising from the glass is a fine and minute foam like champagne, and the foam arises linearly. In addition, the beer-like foam makes the mouth feel smooth, and further provides a texture.

DESCRIPTION OF EMBODIMENTS

Hereinafter, the present invention will be described in detail.

<Unfermented Beer-Taste Beverage>

An unfermented beer-taste beverage of the present invention comprises a soybean dietary fiber.

[Soybean Dietary Fiber]

Soybean dietary fibers usable in the present invention are soybean dietary fibers obtainable by various conventional known methods. Here, an example of a method for producing the soybean dietary fiber is a production method in which soy pulp (Okara) obtained as a by-product in production of tofu, soy milk, or soy protein isolate or defatted soybean meal is used as an ingredient; a dietary fiber is extracted into an aqueous solution, preferably, in a weakly acidic range near the isoelectric point of the soybean protein at a high-temperature; and then an aqueous solution of the dietary fiber is obtained by solid-liquid separation. The ingredient of the soybean dietary fiber is preferably soy pulp which is obtained in the production of soy protein isolate, and which has low oil and protein contents. The extraction temperature is preferably a temperature exceeding 100° C.

The obtained soybean dietary fiber in the extraction liquid may be used directly in the form of the extraction liquid, or after purification for a better function of the soybean dietary fiber. A purification method conventionally known as a method for purifying a high-molecular polymer can be used as appropriate as a method for purifying the soybean dietary fiber.

The soybean dietary fiber which can be added to the beer-taste beverage of the present invention is not particularly limited, as long as the dietary fiber is obtained from soybean. The soybean dietary fiber preferably satisfies a condition that the NIBEM thereof in a 0.1% by mass aqueous solution with a pH of 3.5 is 160 or higher. In addition, as will be described later, the soybean dietary fiber which can be added to the beer-taste beverage of the present invention preferably has an average molecular weight measured by gel filtration HPLC of 1000000 or less. For example, "SOYAFIBE-S-LA200" and "SOYAFIBE-S-LN" (each of which is a trade name, FUJI OIL CO., LTD.) can be used as the soybean dietary fiber, although the soybean dietary fiber is not particularly limited thereto. These soybean dietary fibers may be used alone or as a mixture.

The average molecular weight of the soybean dietary fiber is an average molecular weight measured by gel filtration HPLC (column: TSKgel-G-5000PWXL (7.8 cm×30 cm, trade name, Tosoh Corporation), standard substance: pullulan P-82 (trade name, Showa Denko K. K.), mobile phase: 50 mM aqueous sodium acetate solution (pH 5.0), flow rate: 1.0 mL/min). The average molecular weight of the soybean dietary fiber is preferably 1000000 or less, more preferably 200000 or more but 1000000 or less, and further preferably 400000 or more but 600000 or less. In addition, the NIBEM of the soybean dietary fiber in a 0.1% by mass aqueous solution with a pH of 3.5 is preferably 160 or higher, and further preferably 170 or higher.

Note that the NIBEM refers to a numeric value measured as follows. Specifically, while being allowed to foam, an aqueous solution of 20° C. packed in a bottle or a can is ejected with a carbon dioxide flow rate of 1500 mL/minute to 1700 mL/minute into a cylindrical glass with an inner diameter of 60 mm and a height from a liquid bottom surface of 120 mm, to thereby fill the glass with the foam. Then, the time taken when the surface of the collapsing foam descends from a plane 10 mm away from the top rim of the glass to a plane 40 mm away therefrom is automatically measured with an electrode-type contact sensor to obtain the numeric value.

The content of the soybean dietary fiber in the beer-taste beverage of the present invention is preferably 0.03% by mass or more but 0.3% by mass or less, and further preferably 0.05% by mass or more but 0.2% by mass or less. When the content of the soybean dietary fiber is within the above range, the beer-taste beverage is capable of forming a fine and long-lasting foam.

[Hops or Bitter Flavoring Agent]

The beer-taste beverage of the present invention may comprise hops and/or a bitter flavoring agent, in addition to the soybean dietary fiber. When the beer-taste beverage comprises hops or a bitter flavoring agent, the beer-taste beverage is provided with a moderate bitterness, and exhibits a beer-like taste and flavor.

When hops are added to the beer-taste beverage of the present invention, the hops are preferably added before a boiling treatment for a liquid sugar solution obtained by saccharification, such as wort. The flavor and odor of the hops can be extracted, by boiling, into the liquid sugar solution by adding, in this manner, the hops to the liquid sugar solution obtained by saccharification. The added amount, adding method (for example, hops are added as several divided portions, or the like), boiling conditions, and the like of the hops can be determined as appropriate. In addition, the deposited sediment of proteins and the like are preferably removed after the boiling.

In addition, when the bitter flavoring agent is added to the beer-taste beverage of the present invention, the bitter flavoring agent may be added at any stage. For example, the bitter flavoring agent may be added before the saccharification of the ingredient solution such as wort, or may be added immediately before, during, or after the boiling of the liquid sugar solution. A conventionally known bitter flavoring agent selected from bitter substances derived from hops, caffeine, Gentian extract, peptides, theobromine, naringin, Picrasma quassioides extract, worm wood extract, Redbark cinchona extract, and the like can be used as the bitter flavoring agent.

[pH]

The beer-taste beverage of the present invention has a pH of preferably 3 or higher but 4.5 or lower, and further preferably 3.5 or higher but 4 or lower. The beer-taste beverage has favorable flavor when the pH is adjusted within the range.

<Method for Producing Unfermented Beer-Taste Beverage>

Next, description is given of a general method for producing an unfermented beer-taste beverage of the present invention.

Basically, the unfermented beer-taste beverage of the present invention is produced by adding a soybean dietary fiber to a liquid sugar solution prepared by using malt or the like, and adding carbon dioxide gas to the liquid sugar solution without fermentation using yeast. Alternatively, the unfermented beer-taste beverage may be produced by adding a soybean dietary fiber to an aqueous solution prepared without use of malt or the like, and adding carbon dioxide gas to the aqueous solution without fermentation using yeast.

In general, hot water and, if necessary, starch such as rice or corn starch are first added to a ground product or the like of malt or the like, and then the materials are mixed with each other and heated. Thus, the starch is saccharified by utilizing mainly the enzyme of malt. The liquid sugar solution is filtered to obtain a filtrate, and, for example, auxiliary ingredients, such as saccharides, cereal syrups, cereal extracts, fruit juices, bitter flavoring agents, pigments, and hops, are added to the filtrate, and the mixture is boiled. Note that hops are preferably added, and the hops are further preferably added before the boiling, in the method for producing a beer-taste beverage of the present invention.

As for the conditions for boiling the liquid sugar solution containing hops, the boiling is conducted preferably at a temperature of 100° C. or above for about 60 minutes to 90 minutes. By the boiling at a high-temperature for a certain period, a acids in the hops can be converted into iso-α acids.

The soybean dietary fiber may be added at any stage to the beer-taste beverage of the present invention. For example, the soybean dietary fiber may be added before the saccharification of the ingredient solution such as wort, or may be added immediately before, during, or after the boiling of the liquid sugar solution. In addition, when hops are added in the production of the beer-taste beverage of the present invention, the soybean dietary fiber may be added simultaneously with the hops, or may be added at a different time from the addition of the hops. After the boiling, deposits such as sediment of the hops are removed, and carbon dioxide gas is added. Thus, a target beer-taste beverage is obtained.

In addition, the pH of the beer-taste beverage may be adjusted before or after the boiling.

The ingredients used in the present invention, including the ground product of malt, the starch such as rice or corn starch, the liquid sugar containing a carbon source, and a nitrogen source as an amino acid-containing material other than barley or malt, are not particularly limited, and those ordinary used when conventional beer-taste beverages are produced can be used in amounts ordinary employed.

In addition, although the beer-taste beverage of the present invention is not fermented, the beer-taste beverage can be converted to an alcoholic beverage by adding alcohol thereto. Here, alcohol which can be added is not limited, and examples thereof include alcohol for material, beer, Shochu (Japanese distilled beverages), Awamori (an alcoholic beverage indigenous to Okinawa), whiskeys, brandies, vodkas, rums, tequilas, gins, spirits, and the like. The amount of the alcohol added can be adjusted as appropriate in consideration of the final alcohol concentration of the beer-taste beverage. The alcohol may be added to the beer-taste beverage at any stage.

EXAMPLES

Hereinafter, the present invention is described in detail with reference to Examples. Note that the present invention is not limited to the following Examples at all.

First, the following are suppliers of ingredients used for unfermented beer-taste beverages in Examples and Comparative Examples.

(Soybean Dietary Fiber)

"SOYAFIBE-S-LA200 (trade name)," "SOYAFIBE-S-LN (trade name)," "SOYAFIBE-S-ZR100 (trade name)," "SOYAFIBE-S-DN (trade name)," "SOYAUP R100 (trade name)," "SOYAUP M3000 (trade name)": each available from FUJI OIL CO., LTD.

"SM700 (trade name)": available from San-Ei Gen F. F. I., Inc. (Soybean Peptide)

"HI-NUTE-AM (trade name)," "HI-NUTE-DC6 (trade name)": each available from FUJI OIL CO., LTD.

(Soybean Saponin)

"Soyhealth SA (trade name)": available from FUJI OIL CO., LTD. (Dietary Fiber (Polydextrose))

"Litesse (trade name)," "Litesse II (trade name)," "Litesse Ultra (trade name)": each available from Danisco Japan Ltd. (Alginic Acid Ester)

"KIMILOID BF (trade name)": available from KIMICA corporation

"Biofoam AT (trade name)": available from KERRY (Quillaja Saponin)

"Quillajanin S-100 (trade name)": available from Maruzen Pharmaceuticals Co., Ltd.

Example 1

A soybean dietary fiber "SOYAFIBE-S-LA200" was dissolved in water to prepare a 0.20 w/v % aqueous solution. Subsequently, 175 mL of the obtained aqueous solution of the soybean dietary fiber and 175 mL of carbonated water were packed in a 350-mL can. Thus, a carbonated beverage having a soybean dietary fiber content of 0.10 w/v % and a gas volume of 2.3 was obtained.

Example 2, Comparative Examples 1 to 14

Carbonated beverages with predetermined concentrations were obtained in the same manner as in Example 1, except that materials shown in Table 1 were used instead of "SOYAFIBE-S-LA200" of Example 1. The amount of each material added was set to an amount enough to obtain an adequate foaming. When foaming did not occur, an excessive amount of the material was used. Specific added amounts are shown in Table 1.

TABLE 1

| | Material Name | Trade Name | Added amount (w/v %) |
|---|---|---|---|
| Example 1 | Soybean dietary fiber | SOYAFIBE-S-LA200 | 0.10 |
| Example 2 | | SOYAFIBE-S-LN | 0.10 |
| Comp. Ex. 1 | | SOYAFIBE-S-ZR100 | 0.10 |
| Comp. Ex. 2 | | SOYAFIBE-S-DN | 0.10 |
| Comp. Ex. 3 | | SOYAUP R100 | 0.10 |
| Comp. Ex. 4 | | SOYAUP RM3000 | 0.80 |
| Comp. Ex. 5 | | SM700 | 0.10 |
| Comp. Ex. 6 | Soybean peptide | HI-NUTE-AM | 0.30 |
| Comp. Ex. 7 | | HI-NUTE-DC6 | 0.30 |
| Comp. Ex. 8 | Soybean saponin | Soyhealth SA | 0.10 |
| Comp. Ex. 9 | Dietary fiber | Litesse II | 0.50 |
| Comp. Ex. 10 | (polydextrose) | Litesse III | 1.00 |
| Comp. Ex. 11 | | Litesse Ultra | 0.50 |
| Comp. Ex. 12 | Alginic acid ester | KIMILOID BF | 0.02 |
| Comp. Ex. 13 | | Biofoam AT | 0.01 |
| Comp. Ex. 14 | Quillaja saponin | Quillajanin S-100 | 0.02 |

[Evaluations]

The carbonated beverages prepared as described above were each poured into a 200-mL graduated cylinder from a constant height at a constant speed. The state of foam, including foamability, foam-retention property, foam quality, and the like, was visually observed, and evaluated based on the following evaluation criteria. In addition, each of the carbonated beverages was evaluated in terms of transparency and flavor on the basis of the following evaluation criteria. The results thereof are shown in Table 2.

(State of Foam)

◯: The state of foam was very good.

Δ: The state of foam was fair.

x: The state of foam was poor.

(Transparency)
○: Transparent
Δ: Slightly turbid
x: Turbid
(Flavor)
○: Good
Δ: Fair
x: Poor

TABLE 2

|  | State of foam | Transparency | Flavor |
| --- | --- | --- | --- |
| Example 1 | ○ | ○ | ○ |
| Example 2 | ○ | ○ | ○ |
| Comp. Ex. 1 | Δ | Δ | ○ |
| Comp. Ex. 2 | Δ | ○ | ○ |
| Comp. Ex. 3 | x | ○ | ○ |
| Comp. Ex. 4 | x | x | x |
| Comp. Ex. 5 | Δ | ○ | ○ |
| Comp. Ex. 6 | ○ | ○ | Δ |
| Comp. Ex. 7 | ○ | ○ | Δ |
| Comp. Ex. 8 | Δ | x | x |
| Comp. Ex. 9 | x | ○ | ○ |
| Comp. Ex. 10 | x | ○ | ○ |
| Comp. Ex. 11 | x | ○ | ○ |
| Comp. Ex. 12 | ○ | ○ | x |
| Comp. Ex. 13 | ○ | Δ | x |
| Comp. Ex. 14 | ○ | ○ | x |

As shown in FIG. 2, the beer-taste beverages using "SOYAFIBE-S-LA200" or "SOYAFIBE-S-LN" were better in terms of the state of foam, the transparency, and the flavor than the beer-taste beverages using none of them.

Examples 3 to 10

Carbonated beverages were obtained in the same manner as in Example 1, except that the amount of "SOYAFIBE-S-LA200" added in Example 1 was changed as shown in Table 3.

TABLE 3

|  | Content (w/v %) |
| --- | --- |
| Example 3 | 0.010 |
| Example 4 | 0.030 |
| Example 5 | 0.050 |
| Example 6 | 0.075 |
| Example 1 | 0.100 |
| Example 7 | 0.150 |
| Example 8 | 0.200 |
| Example 9 | 0.300 |
| Example 10 | 0.500 |

[Evaluations]

The carbonated beverages prepared as described above were each poured into a 200-mL graduated cylinder from a constant height at a constant speed. The state of foam, including foamability, foam-retention property, foam quality, and the like, was visually observed, and evaluated based on the following evaluation criteria. In addition, each of the carbonated beverages was evaluated in terms of transparency and flavor on the basis of the following evaluation criteria. The results thereof are shown in Table 4.

(State of Foam)
○: The state of foam was very good.
Δ: The state of foam was fair.
x: The state of foam was poor.

(Transparency)
○: Transparent
Δ: Slightly turbid
x: Turbid
(Flavor)
○: Good
Δ: Fair
x: Poor

TABLE 4

|  | State of foam | Transparency | Flavor |
| --- | --- | --- | --- |
| Example 3 | x | ○ | ○ |
| Example 4 | Δ | ○ | ○ |
| Example 5 | ○ | ○ | ○ |
| Example 6 | ○ | ○ | ○ |
| Example 1 | ○ | ○ | ○ |
| Example 7 | ○ | ○ | ○ |
| Example 8 | ○ | ○ | ○ |
| Example 9 | ○ | ○ | Δ |
| Example 10 | ○ | ○ | x |

As shown in Table 4, the beer-taste beverages containing 0.03% by mass to 0.3% by mass of the soybean dietary fiber had particularly excellent state of foam, transparency, and flavor.

Examples 11 to 16

A soybean dietary fiber "SOYAFIBE-S-LA200" was dissolved in water to prepare 0.20 w/v % aqueous solutions. Appropriate amounts of lactic acid were added to these solutions to adjust the pHs to the values shown in Table 5. Subsequently, 175 mL each of the obtained aqueous solutions of the soybean dietary fiber and 175 mL of carbonated water were packed in a 350-mL can. Thus, carbonated beverages each having a soybean dietary fiber content of 0.10 w/v % and a gas volume of 2.3 were obtained.

TABLE 5

|  | pH |
| --- | --- |
| Example 11 | 2.7 |
| Example 12 | 3.0 |
| Example 13 | 3.5 |
| Example 14 | 4.0 |
| Example 15 | 4.5 |
| Example 16 | 4.7 |

[Evaluation]

The carbonated beverages prepared as described above were evaluated in terms of flavor based on the following evaluation criteria. The results thereof are shown in Table 6.

|  | Flavor |
| --- | --- |
| Example 11 | x |
| Example 12 | Δ |
| Example 13 | ○ |
| Example 14 | ○ |
| Example 15 | Δ |
| Example 16 | x |

As shown in Table 6, the adjustment of the pH within the range from 3 to 4.5 provided a particularly excellent flavor to the beer-taste beverages.

Examples 17 to 20, Comparative Example 15 and 16

The soybean dietary fibers shown in Table 7 were dissolved in water to prepare 0.20 w/v % aqueous solutions.

Appropriate amounts of lactic acid were added to these solutions to adjust the pH values thereof to the values shown in Table 7. Subsequently, 175 mL of each of the obtained aqueous solutions and 175 mL of carbonated water were packed in a 350-mL can. Thus, carbonated beverages each having a soybean dietary fiber content of 0.10 w/v % and a gas volume of 2.3 were obtained.

While being allowed to foam, each carbonated beverage of 20° C., which was prepared as described above and packed in the can, was ejected with a carbon dioxide flow rate of 1500 mL/minute to 1700 mL/minute into a cylindrical glass with an inner diameter of 60 mm and a height from a liquid bottom surface of 120 mm, to thereby fill the glass with the foam. The time taken when the surface of the collapsing foam descended from a plane 10 mm away the top rim of the glass to a plane 40 mm away therefrom was automatically measured with an electrode-type contact sensor. Table 7 shows the results.

TABLE 7

| | Soybean dietary fiber | Added amount (w/v %) | pH | NIBEM |
|---|---|---|---|---|
| Example 17 | SOYAFIBE-S-LA200 | 0.10 | 3.5 | 193 |
| Example 18 | SOYAFIBE-S-LN | 0.10 | 3.5 | 190 |
| Comp. Ex. 15 | SOYAFIBE-S-DN | 0.10 | 3.5 | 143 |
| Comp. Ex. 16 | SM700 | 0.10 | 3.5 | 150 |
| Example 19 | SOYAFIBE-S-LA200 | 0.10 | 5.9 | 143 |
| Example 20 | SOYAFIBE-S-LN | 0.10 | 5.9 | 163 |

Example 21

An aqueous solution containing a soybean dietary fiber and a bitter flavoring agent was prepared by adding the ingredients shown in the following Table 8 in the amounts shown in Table 8. Carbon dioxide gas was added to the obtained aqueous solution to achieve a gas volume of 2.3. The obtained carbonated beverage was subjected to a sensory evaluation in terms of beer-likeness, texture, and palatability. The sensory evaluation was conducted by 10 trained in-house panelists based on the following evaluation criteria. A carbonated beverage to which no bitter flavoring agent was added was subjected to the same evaluation. Table 9 shows the results.

(Beer-Likeness)
5: Beer-like
4: Slightly beer-like
3: Intermediate
2: Slightly not beer-like
1: Not beer-like
(Texture)
3: Good
2: Fair
1: Poor
(Palatability)
5: Palatable
4: Slightly palatable
3: Intermediate
2: Slightly unpalatable
1: Unpalatable

TABLE 8

| Content | Blended amount (g/L) |
|---|---|
| 67% sucrose liquid sugar | 30.00 |
| Citric acid | 0.35 |
| SOYAFIBE-S-LA200 | 1.00 |
| Liquid caramel SP | 0.30 |
| Hops extract | 0.10 |

TABLE 9

| Sample | Without bitter flavoring agent | With bitter flavoring agent |
|---|---|---|
| Beer-likeness | 3.3 | 4.5 |
| Texture | 2.0 | 3.0 |
| Palatability | 3.2 | 4.5 |
| Comments | Shortage of bitterness Watery | Stimulating Beer-like Tight taste Good to drink |

As shown in Table 9, the beer-taste beverage to which no bitter flavoring agent was added was good in terms of beer-likeness, texture, and palatability, whereas the beer-taste beverage to which the bitter flavoring agent was added was very good in terms of beer-likeness, texture, and palatability.

The invention claimed is:

1. A method for producing an unfermented, non-alcohol, beer-taste beverage, comprising:
    (a) preparing a liquid sugar solution;
    (b) adding to the liquid sugar solution a soybean dietary fiber having a NIBEM in a 0.1% by mass aqueous solution with a pH of 3.5 of at least 160 to form a mixture; and,
    (c) preparing an unfermented, non-alcohol, beer-taste beverage from the liquid sugar solution-dietary fiber mixture without fermentation,
    wherein the resulting beer-taste beverage has a pH of 3.5 to 4.0, and wherein an amount of the added soybean dietary fiber is 0.05% by mass or more but 0.2% by mass or less of the resulting beer-taste beverage, wherein no malt is used.

2. The method of claim 1, wherein the soybean dietary fiber has an average molecular weight measured by gel filtration HPLC of 1,000,000 or less.

3. The method of claim 1, further comprising adding at least one of hops or a bitter flavoring agent to the liquid sugar solution.

4. The method of claim 1, wherein step (c) comprises adding carbon dioxide gas to the liquid sugar solution-dietary fiber mixture.

5. The method of claim 1, wherein step (c) comprises packing the liquid sugar solution-dietary fiber mixture into a container.

\* \* \* \* \*